United States Patent
Teramura

(10) Patent No.: US 8,190,321 B2
(45) Date of Patent: *May 29, 2012

(54) ELECTRONIC CONTROL UNIT WITH PERMISSION SWITCHING

(75) Inventor: Mikio Teramura, Okazaki (JP)

(73) Assignee: Denso Corporation, Kariya (JP)

( * ) Notice: Subject to any disclaimer, the term of this patent is extended or adjusted under 35 U.S.C. 154(b) by 925 days.

This patent is subject to a terminal disclaimer.

(21) Appl. No.: 12/185,274

(22) Filed: Aug. 4, 2008

(65) Prior Publication Data

US 2009/0037046 A1 Feb. 5, 2009

(30) Foreign Application Priority Data

Aug. 3, 2007 (JP) ................................ 2007-203110

(51) Int. Cl.
*G01M 17/00* (2006.01)
(52) U.S. Cl. ...................... 701/30.1; 701/29.7; 701/31.7; 701/32.2; 701/33.4; 702/187
(58) Field of Classification Search ................ 701/29.1, 701/33.4, 30.1, 29.7, 31.7, 32.2; 702/187
See application file for complete search history.

(56) References Cited

U.S. PATENT DOCUMENTS

| | | | | |
|---|---|---|---|---|
| 5,111,402 | A | * | 5/1992 | Brooks et al. ................... 701/35 |
| 5,485,596 | A | * | 1/1996 | Igarashi et al. ................ 701/101 |
| 5,899,947 | A | * | 5/1999 | Hall et al. ....................... 701/33 |
| 5,935,180 | A | * | 8/1999 | Fieramosca et al. ............ 701/29 |
| 5,936,152 | A | * | 8/1999 | Nishioka et al. ............ 73/114.25 |
| 5,964,813 | A | | 10/1999 | Ishii et al. |
| 6,067,642 | A | * | 5/2000 | Paye ............................... 714/45 |
| 6,601,015 | B1 | | 7/2003 | Milvert et al. |
| 6,604,027 | B1 | * | 8/2003 | Kawakami et al. ............... 701/1 |
| 6,720,772 | B2 | | 4/2004 | Oosawa |
| 6,856,844 | B1 | * | 2/2005 | McKenzie ...................... 700/96 |
| 6,915,192 | B2 | * | 7/2005 | Hashimoto et al. ............. 701/36 |
| 7,788,005 | B2 | * | 8/2010 | Enomoto et al. ................ 701/29 |
| 2003/0078701 | A1 | * | 4/2003 | Sunami et al. .................... 701/1 |
| 2003/0146754 | A1 | | 8/2003 | Oosawa |

(Continued)

FOREIGN PATENT DOCUMENTS

JP 8-202441 8/1996

(Continued)

OTHER PUBLICATIONS

English Machine Translation Hirotaka JP-2006-291730.*

(Continued)

*Primary Examiner* — Darnell Jayne
*Assistant Examiner* — Sasha T Varghese
(74) *Attorney, Agent, or Firm* — Nixon & Vanderhye P.C.

(57) ABSTRACT

An electronic control unit installed in a vehicle performs diagnosis of plural diagnosis objects based on sensor signals, and stores diagnosis results that indicate abnormality of the diagnosis objects in a DTC storage area only when the DTC storage area does not store data having an initial value. The data in the DTC storage area is, in other words, rewritten to different values from the initial value for allowing storage of DTCs when the electronic control unit determines that all of the diagnosis objects are in a normal condition with no indication of abnormality after performing diagnosis, thereby making it possible to exclusively prevent useless abnormality information detected during a vehicle manufacturing process from being stored in an rewritable non-volatile memory.

10 Claims, 4 Drawing Sheets

U.S. PATENT DOCUMENTS

| | | | |
|---|---|---|---|
| 2005/0015160 A1* | 1/2005 | Hashimoto et al. | 700/20 |
| 2005/0034015 A1* | 2/2005 | Hashimoto et al. | 714/18 |
| 2005/0080529 A1* | 4/2005 | Hashimoto et al. | 701/36 |
| 2005/0192723 A1* | 9/2005 | Noguchi | 701/35 |
| 2006/0248500 A1* | 11/2006 | O'Donoghue | 717/100 |
| 2007/0083304 A1* | 4/2007 | Yamada | 701/29 |
| 2007/0106430 A1* | 5/2007 | Goto et al. | 701/1 |
| 2007/0180318 A1* | 8/2007 | Morozumi | 714/23 |
| 2008/0161991 A1* | 7/2008 | Hatori | 701/31 |
| 2009/0037044 A1* | 2/2009 | Enomoto et al. | 701/33 |

FOREIGN PATENT DOCUMENTS

| | | |
|---|---|---|
| JP | 11-141391 | 5/1999 |
| JP | 2000-267942 | 9/2000 |
| JP | 2006-291730 | 10/2006 |

OTHER PUBLICATIONS

Extended European Search Report dated Mar. 11, 2011, issued in corresponding European Application No. 08013848.0-1263.

U.S. Appl. No. 12/185,282, Nakagaki et al., filed Aug. 4, 2008, (JP 2007-203108).

Japanese Office Action dated Jun. 30, 2009, issued in corresponding Japanese Application No. 2007-203110, with English translation.

"Multifunction and Diagnostic System Requirements for 2004 and Subsequent Model-Year Passenger Cars, Light-Duty Trucks, and Medium-Duty Vehicles and Engines", Title 13, California Code Regulations, Section 1968.2 (OBD II).

U.S. Appl. No. 12/180,754, Hiroyuki Enomoto et al., filed Jul. 28, 2008, (JP 2007203109 and JP 2007-295490).

* cited by examiner

ELECTRONIC CONTROL UNIT WITH PERMISSION SWITCHING

CROSS REFERENCE TO RELATED APPLICATION

The present application is based on and claims the benefit of priority of Japanese Patent Application No. 2007-203110 filed on Aug. 3, 2007, the disclosure of which is incorporated herein by reference.

FIELD OF THE INVENTION

The present disclosure generally relates to an electronic control unit for storing abnormality information as a result of diagnosis in a rewritable non-volatile memory.

BACKGROUND INFORMATION

The electronic control unit stores, as a result of diagnosis, abnormality information, e.g., Diagnostic Trouble Code (DTC), of various diagnosis objects in a rewritable non-volatile memory such as an EEPROM or the like based on information from various sensors installed in the vehicle indicating faulty operation of the diagnosis object.

The electronic control unit having the above-mentioned function may be operated, for example, during a manufacturing process of the vehicle. In such a case, the electronic control unit is operated in a condition that the assembly of the electronic control unit has not yet been complete, that is, in a condition that the apparatus is being operable in the vehicle without the connection of connectors to peripheral devices such as relevant sensors, electronic loads and the like.

Thus, if the electronic control unit is operated to perform diagnosis of peripheral devices, the abnormality is detected by the apparatus, thereby leading to storage of useless abnormality information in the rewritable non-volatile memory.

Therefore, the electronic control unit disclosed in, for example, Japanese patent document JP-A-2006-291730, has a configuration for avoiding storage of the useless abnormality information. That is, the apparatus determines whether or not the vehicle is being used by a user based on a driving condition of the vehicle such as a vehicle speed, an engine rotation or the like, and starts storage of a diagnosis result to a storage unit after determining that the use of the vehicle by the user has been started.

However, the above disclosure uses, as a criterion for starting storage of the diagnosis result, a driving condition that can be assumed as a use of the vehicle by a user and cannot be assumed to be happening in the manufacturing process of the vehicle. Thus, the start of the storage of the diagnosis result may be delayed by a certain period from an actual start of the use of the vehicle by the user.

Therefore, the abnormality information regarding abnormality that has happened relatively immediately after the start of the use of the vehicle by the user, that is, the abnormality information that should be stored, may be prevented from being stored in the rewritable non-volatile memory.

SUMMARY OF THE INVENTION

In view of the above and other problems, an aspect of the present disclosure provides an electronic control unit configured to exclusively prevent storage of useless abnormality information detected by the apparatus in a rewritable non-volatile memory from among all of the detected abnormality information during a manufacturing process of the vehicle for installing the apparatus in the vehicle.

The electronic control unit installed in a vehicle includes: a non-volatile memory capable of re-writing data stored therein; and a diagnosis unit capable checking if failure is occurred in a device installed in the vehicle based on information therefrom and of storing abnormality data in the non-volatile memory after determining abnormality has occurred in the device installed in the vehicle.

The apparatus further includes: a permission information storage capable of storing permission information indicating whether or not storage of the abnormality information in the non-volatile memory is permitted; and a permission switching unit capable of switching the permission information from non-permission of the storage of the abnormality information to permission of the storage of the abnormality information after the diagnosis unit has determined that the device installed in the vehicle is in a normal condition with no indication of abnormality.

Furthermore, the apparatus includes a storage permission unit capable of permitting the diagnosis unit to store the abnormality information in the non-volatile memory when the permission information stored in the permission information storage indicates permission of the storage of the abnormality information in the non-volatile memory.

The above-mentioned electronic control unit does not store the abnormality information in the rewritable non-volatile memory even when an assembly of the apparatus being in a non-completion condition yields diagnosis indicating abnormality during its operation in a vehicle manufacturing process, because the permission information in the permission information storage still indicates non-permission of the storage of the abnormality information. In this case, the completion of the assembly of the electronic control unit means that the all of the relevant devices in the vehicle intended to be connected to the apparatus such as sensors, electronic loads or the like are orderly connected to the apparatus.

When the normal condition of the apparatus and the devices based on the diagnosis of the diagnosis unit after completion of the installation of the apparatus in the vehicle is detected by the permission switching unit, the permission information is switched from indicating the non-permission of the storage to indicating the permission of the storage.

At the point of detecting the normal condition, the storage permission unit permits the storage of the abnormality information in the rewritable non-volatile memory. Therefore, the abnormality detected based on the diagnosis by the diagnosis unit is stored in the rewritable non-volatile memory.

The electronic control unit being operated in the above operation scheme prevents useless abnormality information detected during the installation process of the apparatus from being stored in the rewritable non-volatile memory, and permits the abnormality information detected after the completion of installation of the apparatus in the vehicle to be stored in the rewritable non-volatile memory. That is, in other words, the useless abnormality information that is detected during the manufacturing process of the vehicle is exclusively prevented from being stored in the rewritable non-volatile memory.

Regarding vehicle diagnosis, the regulation of California Air Resources Board (CARB) requires that DTC that has been stored as the diagnosis results is stored in a rewritable non-volatile memory such as EEPROM of an electronic control unit as a permanent fault code (Permanent Diagnostic Trouble Code, or PDTC), and the PDTC must not be erasable by a command from an external tool that is capable of communicating with the electronic control unit. However, the above-mentioned electronic control unit is readily compliant to the above requirement, because the useless information to be erased is prevented from being stored in the rewritable non-volatile memory.

In addition, if the diagnosis unit is configured to determine not only whether or not the diagnosis object is abnormal but also whether or not the diagnosis object is normal, the permission switching unit may refer to the diagnosis result of the diagnosis unit regarding the diagnosis object. That is, in other words, the permission switching unit may be configured to determine that the diagnosis object is normal when the diagnosis unit determines that the diagnosis object is normal.

Further, the diagnosis object may be only one device, or may be plural devices. In this case, if the diagnosis unit performs diagnosis for plural diagnosis objects, the permission switching unit may determine that the diagnosis result is normal when the diagnosis by the diagnosis unit regarding all of the diagnosis objects is not abnormal.

Furthermore, the above advantageous effects are achieved by devising that the data in the non-volatile memory is changed from an initial value to a different value, as an indicator of permission of the storage of the DTC, at a time after completion of the installation of the electronic control unit in the vehicle and before shipment of the vehicle from the factory.

BRIEF DESCRIPTION OF THE DRAWINGS

Other objects, features and advantages of the present invention will become more apparent from the following detailed description made with reference to the accompanying drawings, in which.

DETAILED DESCRIPTION

Figure 1:
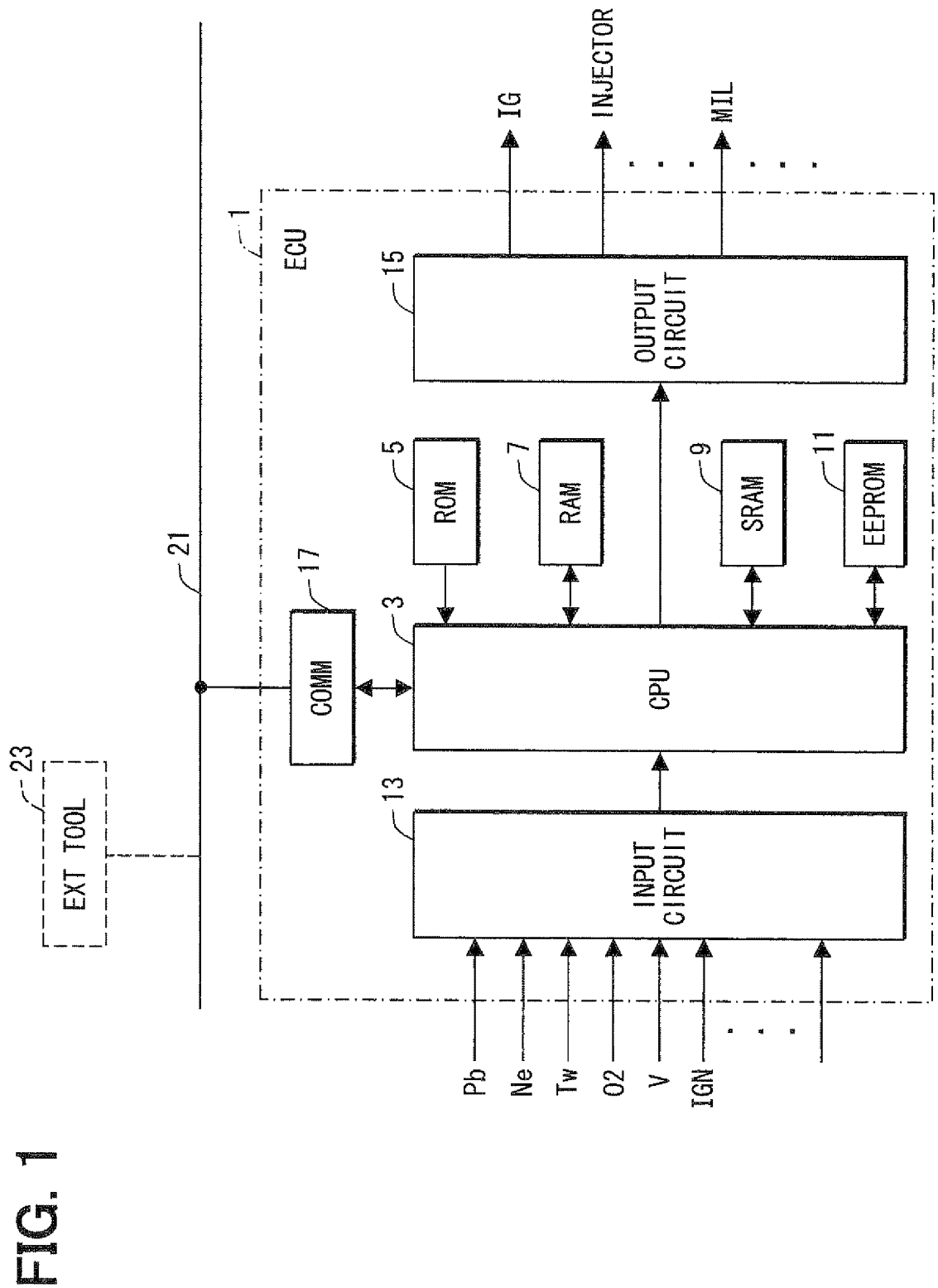
FIG. 1 is a configuration diagram showing an ECU (an electronic control unit) in an embodiment of the present invention.

An embodiment of the present invention is explained in the following. First, FIG. 1 is a configuration showing an electronic control unit (ECU) 1 of the present embodiment. In addition, the ECU 1 of the present embodiment is installed in a vehicle, and the engine of the vehicle is controlled thereby.

As for the ECU 1, a CPU (a central processing unit) 3, a ROM 5 to store a program executed by the CPU 3, data referred to in the execution of the program and other data such as diagnosis trouble codes necessary for the ECU 1 for example, a RAM 7 for temporarily store the data, a standby RAM (SRAM) 9 continuously having supply of data retaining electric power, an EEPROM 11 made of rewritable non-volatile memory, an the input circuit 13, and an output circuit 15 as shown in FIG. 1 are included therein.

Various signals such as an output Pb of an inlet pipe pressure sensor, an output Ne of an engine rotation sensor, an output Tw of an engine water temperature sensor, an output O2 of an oxygen sensor (an air-fuel ratio sensor) in an exhaust system, an output V of a vehicle speed sensor, an output IGN of an ignition switch are input into the CPU 3 through the input circuit 13 as information for controlling an engine. In addition, the output circuit 15 outputs a drive signal to electric loads such as an ignition, an injector and a warning lamp (e.g., MIL: Malfunction Indicator Lamp) according an instruction from the CPU 3.

The CPU 3 executes calculation for engine control based on various signals that are input to the CPU 3 through the input circuit 13, and supplies instructions to the output circuit 15 based on the calculation results, to thereby control the electric loads related to the control of the engine. For example, the CPU 3 calculates a valve opening timing and a valve opening period of fuel injectors, and supplies an instruction for driving the injectors to the output circuit 15 based on the calculation results, to thereby control fuel injection into the engine.

In addition, in the ECU 1, a communication circuit 17 for the CPU 3 to communicate with other devices such as a navigation apparatus connected to a communication line 21 in the vehicle or the like is included. Furthermore, an external tool 23 to perform a fault diagnosis of the vehicle or the like connectable to the communication line 21 through a connector which is not illustrated is provided. The external tool 23 is a small personal computer or a device of handy type including a display unit and a microcomputer.

The power supplies to the ECU 1 include an operation power supply that is supplied from an in-vehicle battery (not shown) in association with the on/off operation of the ignition switch, and a backup power supply that is continuously supplied to the standby RAM 9 from the in-vehicle battery even when the ignition switch is held turned off. The ECU 1 operates upon receiving the operation power supply when the ignition switch is turned on. Also, a constant voltage that is generated from the backup power supply by a power supply circuit (not shown) within the ECU 1 is continuously supplied to the standby RAM 9 as the data retention power supply.

The process that the CPU 3 in the ECU 1 carries out is explained in the following. For example, the CPU 3 of the ECU 1 executes, in parallel with processing to control the engine, each of the processes in FIG. 2-FIG. 4 at every predetermined time.

Figure 2:
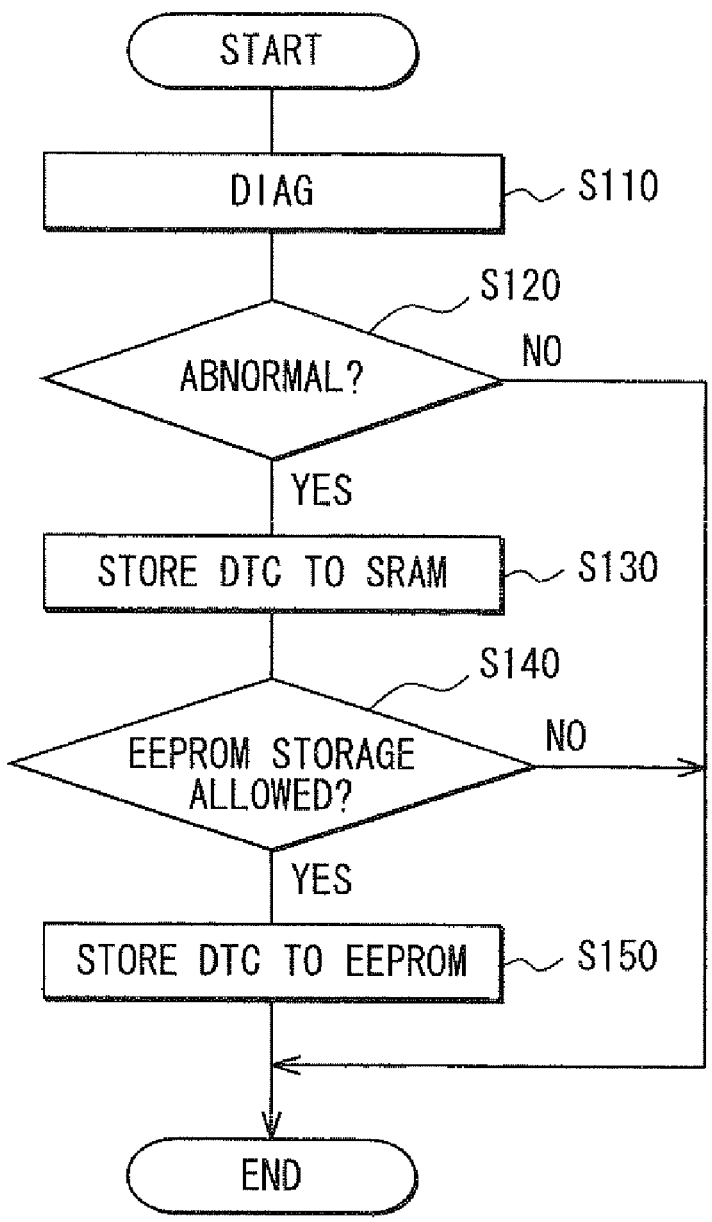
FIG. 2 is a flowchart showing an abnormal information memory processing in the embodiment of the present invention.

First, FIG. 2 is a flowchart showing an abnormal information memory processing. A diagnosis process to detect abnormality in S110 is performed when the CPU 3 starts the execution of the abnormal information memory processing. The processing is to determine whether a device or a section pertaining to a signal is abnormal based on signals from various sensors, switches or the like input through the input circuit 13. The diagnosis is performed for plural diagnosis objects (e.g., diagnosis items).

For example, as the diagnosing process for detecting the abnormality of a certain sensor, the CPU 3 checks whether the output value of the sensor is normal, that is, within a predetermined range or not. If a condition that the output value falls within the predetermined range is kept for a predetermined period, the CPU 3 determines that the sensor is normal. If a condition that the output value does not fall within the predetermined range is kept for a predetermined period, the CPU 3 determines that the sensor is abnormal. In addition, an abnormality detection range for determining the abnormality may be, for some processes, set as a different range as a predetermined range for determining that a device is normal.

Then, in S120, the CPU 3 checks whether there is any abnormality detection item, that is, a diagnosis object, which has been determined as abnormal in the above diagnosing process. If there is no object that has been determined as abnormal, the CPU 3 ends the abnormal information memory processing.

If there is any diagnosis object that has been determined as abnormal (Yes in S120), the CPU 3 proceeds to S130, and stores a diagnostic trouble code (DTC, that is, diagnosis result indicating that the diagnosis object is abnormal) corresponding to the object which has been determined as abnormal in the standby RAM 9. When a predetermined condition is met, for example, when the same abnormality is detected continuously for two trips, the malfunction indicating light is turned on. Each trip may be defined as a period between on-operation and off-operation of the ignition switch.

Then, the process determines whether storage of the DTC to the EEPROM 11 is allowed in S140 next. More practically, the data in the EEPROM 11 is all initialized to zero at the time of the production of the ECU 1. Then, as the EEPROM 11 of the present embodiment is used to store data of 16 bits for each address, data in each address of the EEPROM 11 is set to "$0000" at the time of production of the ECU 1. In this case, the character string starting with '$' sign means that the character string represents a number of hexadecimal notation.

In addition, in the present embodiment, a storage area corresponding to a predetermined address range from a top of the memory address may be, for example, set as a DTC storage for storing the DTC (e.g., the abnormality information memory area, designated as a DTC storage in the following description).

Then, in S140, whether the data of the top address of the DTC storage is "$0000," that is, the initial value is determined. If the data is "$0000", the process determines that DTC storage to the EEPROM 11 is not allowed, and if the data is not "$0000," the process determines that DTC storage to the EEPROM 11 is allowed.

When it is determined that DTC storage to the EEPROM 11 is not allowed in this S140, the abnormality information memory processing is simply finished. When it is determined DTC storage to the EEPROM 11 is allowed, the process proceeds to S150.

Then, in S150, DTC corresponding to the diagnosis object determined to be abnormal by the diagnosis process (DTC which is memorized to the standby RAM in S130) is memorized as a PDTC in the DTC storage of the EEPROM 11. Then, the abnormality information memory processing is finished.

In addition, in S150, DTC is to be memorized sequentially from the top address of the DTC storage. In other words, in the DTC storage, DTC showing abnormality detected earlier is memorized in an address of closer to a top address.

Figure 3:
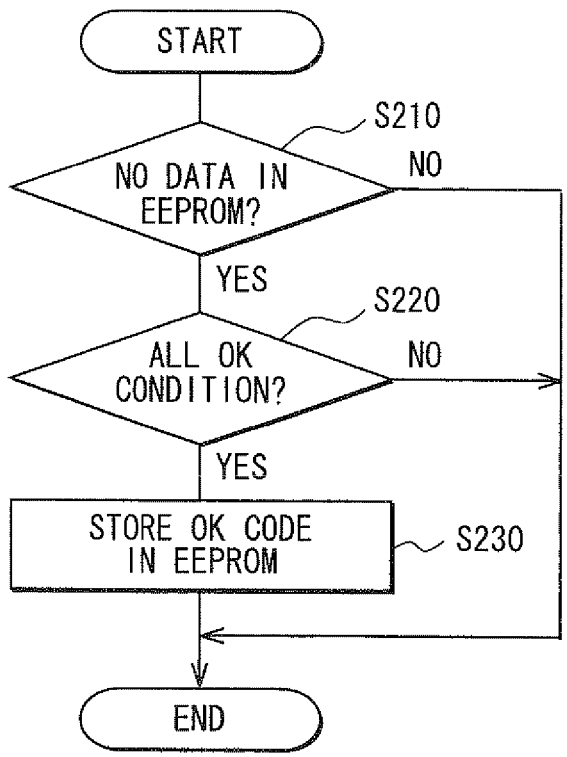
FIG. 3 is a flowchart showing a permission switching process in the embodiment of the present invention.

FIG. 3 is a flowchart showing a permission switching process to change DTC storage to the EEPROM 11 from non-permission state to permission state. When the CPU 3 of the ECU 1 starts execution of the permission switching process, first, in S210, the data of the top address of the DTC storage area in the EEPROM 11 is determined whether it is "$0000" that is identical with the initial value, and the permission switching process is simply finished if the data is not "$0000" (i.e., if some data is overwritten on the initial value). If the data is "$0000," the process proceeds to S220.

In S220, whether all diagnosis objects diagnosed by the diagnosis process (S110 of FIG. 2) that is mentioned above are determined to be normal with no indication of abnormality by the diagnosis process. More practically, whether the diagnosis process has determined that all of the diagnosis objects are normal is determined.

In this case, if some of the diagnosis objects have a relation that a normal condition of a diagnosis object D1 detected by the diagnosis process never leads to an abnormal condition of a diagnosis object D2 by the diagnosis process, determination process for the diagnosis object D2 can be omitted in S220. On the other hand, if there is a certain diagnosis object which is not determined whether or not it is in a normal condition by the diagnosis process, that is, an object which is only determined whether or not it is in an abnormal condition, the diagnosis object of that kind may be determined whether or not it is in a normal condition by performing the diagnosis process anew in S220 (e.g., the diagnosis process for determining whether or not the censor output value is in a normal range).

When all diagnosis objects are not determined to be in a normal condition in S220, the permission switching process concerned is simply finished. However, when all diagnosis objects are determined to be in a normal condition (i.e., when the diagnosis process does not detects a condition of abnormality), the process proceeds to S230.

In S230, the process writes, to the top address of the DTC storage area in the EEPROM 11, a code indicating "normal" (e.g., a code "$5AA5" in the present embodiment) and different from any of the DTC, and then the permission switching process is finished. When, in S230, the data at the top address of the DTC storage area is rewritten from "$0000" to "$5AA5," the storage of the DTC to the EEPROM 11 is determined to be allowed thereafter in S140 of FIG. 2 as mentioned before.

In addition, in S230, "$5AA5" may be written in at all addresses of the DTC storage in the EEPROM 11. Further, in S140 of FIG. 2, whether all data of the DTC storage in the EEPROM 11 are having the initial value ($0000) may be determined. If it is determined that all data is having the initial value, storage of the DTC to the EEPROM 11 is determined to be not allowed, or if it is determined that all data is not having the initial value, storage of the DTC to the EEPROM 11 is determined to be allowed. The same determination scheme is applicable to S320 in FIG. 4 that is mentioned later.

Figure 4:
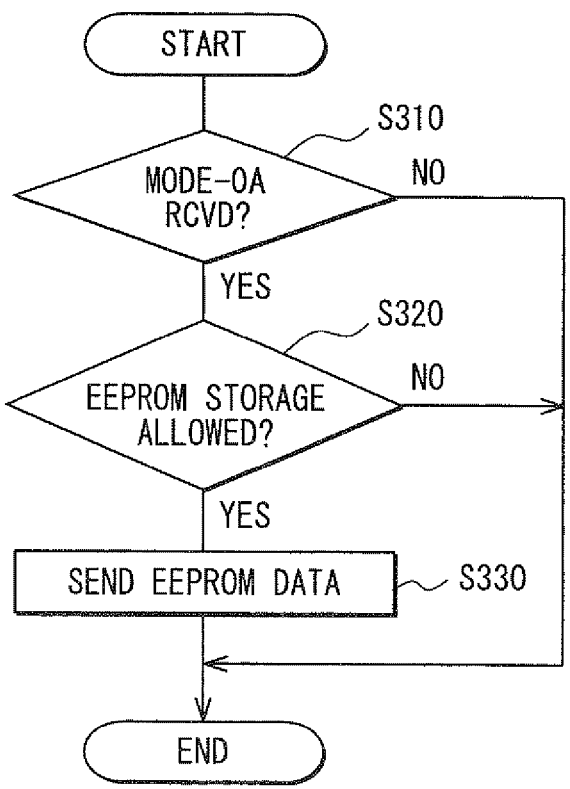
FIG. 4 is a flowchart showing an EEPROM data reply processing in the embodiment of the present invention.

FIG. 4 is a flowchart showing an EEPROM data reply processing for returning data in data of the DTC storage in the EEPROM 11 in response to a request from the external tool 23. When the process is started by the CPU 3 of the ECU 1, whether a "MODE-0A" command requesting the data of the DTC storage area in the EEPROM 11 from among request command signals transmitted from the external tool 23 is received or not is determined in S310.

Subsequently, if the "MODE-0A" command is not received (S310:NO), the EEPROM data reply processing is simply finished. If the "MODE-0A" command is received (S310:YES), the process proceeds to S320, and performs the same processing as S140 of FIG. 2. In other words, it determines whether storage of the DTC to the EEPROM 11 is allowed or not.

When it is determined that storage of the DTC to the EEPROM 11 is not allowed in S320, the EEPROM data reply processing is simply finished. When it is determined that storage of the DTC to the EEPROM 11 is allowed, the process proceeds to S330.

Then, in S330, the data of the DTC storage in the EEPROM 11 is transmitted to the external tool 23, and then the EEPROM data reply processing concerned is finished. In addition, though the flowchart is omitted, the data of the memory area that is set to memorize the DTC in the standby RAM 9 is configured to be transmitted to the external tool 23 when the CPU 3 of the ECU 1 receives a command to request the DTC in the standby RAM 9 from among commands transmitted from the external tool 23.

According to the ECU 1 configured to operate in the above-described manner, if the ECU 1 concerned starts operation in a state that installation of the ECU 1 to the vehicle is not completed during the production process of the vehicle, and the diagnosis process (S110 of FIG. 2) determines abnormality of at least one of the diagnosis objects, the DTC is not stored to the EEPROM 11 due to the data in the EEPROM 11 being maintained as the initial value at that point and due to the determination that the data indicates that the storage of the DTC to the EEPROM 11 is not allowed.

Then, upon completion of the installation of the ECU to the vehicle that leads to a normal condition of the diagnosis object diagnosed by the diagnosis process as not being abnormal and also leads to a determination in S220 in FIG. 3, the data of the top address of the DTC area in the EEPROM 11 is rewritten from "$0000" of the initial value to "$5AA5" in S230.

Then, starting at the time when the data is rewritten, storage of the DTC to the EEPROM 11 is determined to be allowed in S140 of FIG. 2 and in S320 of FIG. 4. Therefore, the DTC to indicates the abnormality is memorized in the DTC area of the EEPROM 11 thereafter when it is determined that at least one of the diagnosis object is determined to be abnormal by the diagnosis process.

Thus, according to the ECU 1 of the present embodiment, the DTC showing abnormality detected in vain during the installation to the vehicle to (in other words, during a production time of the vehicle) is configured to be prevented from being stored in the EEPROM 11, and the DTC showing abnormality detected after the installation to the vehicle (in other words, after completion of the vehicle) is configured to be permitted to be stored in the EEPROM 11. Therefore, from among the diagnostic trouble codes (DTC's), useless DTC's detected during the production time of the vehicle for indicating abnormality are exclusively prevented from being stored in the EEPROM 11. Further, a similar advantageous effect is achieved when the ECU 1 concerned is changed for a new one in a vehicle repair shop.

Furthermore, according to the ECU 1 of the present embodiment, because permission information of whether or not to permit the storage of the DTC to the EEPROM 11 is configured to be stored to the EEPROM 11, the permission information is continuously maintained even when a vehicle battery is taken off from the vehicle, or even when the vehicle battery decreases or runs out. Therefore, returning to a non-permission (prohibition) condition regarding DTC storage to the EEPROM 11 after the vehicle is started to be used by a user is securely prevented.

Furthermore, in the present embodiment in particular, the DTC storage area in the EEPROM 11 serves as both of the DTC storage and permission information storage. More practically, the data of the top address of the DTC storage area is used as the permission information, and the data being not equal to the initial value indicates that the storage of the DTC to the EEPROM 11 is permitted. Therefore, it is not necessary to establish a dedicated memory area for exclusively storing the permission information in the EEPROM 11, thereby leading to a reduction of the dedicated memory area in the EEPROM 11.

Figure 5:
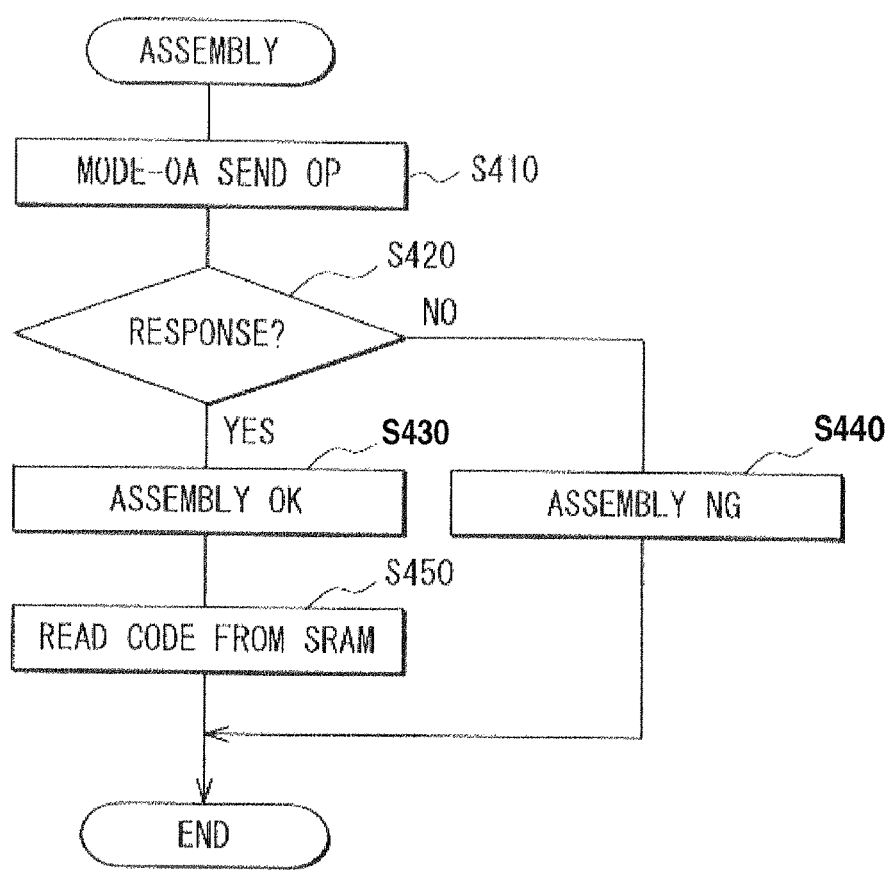
FIG. 5 is a flowchart showing a procedure of the installation confirmation work in the embodiment of the present invention.

In addition, it can be easily confirmed whether installation of the ECU 1 to the vehicle is completed normality by an installation confirmation operation as shown in FIG. 5 in the manufacturing facility of the vehicle because the EEPROM data reply processing of FIG. 4 performed.

That is, the external tool 23 is connected to the communication line 21 after completion of the installation of the ECU 1 to the vehicle, and the external tool 23 is operated to transmit the above-mentioned "MODE-0A" command from the external tool 23 to the ECU 1 (S410). In addition, when an operation to transmit the "MODE-0A" command is performed, the external tool 23 is configured to transmits the "MODE-0A" command to the ECU 1, and also configured to display, on a display unit disposed on the external tool 23, the data which is transmitted from the ECU 1 in response to the command from the external tool 23.

When, from the ECU 1 to the external tool 23, the response data corresponding to the "MODE-0A" command is transmitted, that is, when the data of the DTC storage area in the EEPROM 11 is transmitted (S420:YES), the transmission of the data indicates that all of the diagnosis objects of the diagnosis process in the ECU 1 are in a normal condition and that storage of the DTC to the EEPROM 11 is permitted, thereby leading to a determination that the installation of the ECU 1 to the vehicle is normal (S430).

In addition, when the response data corresponding to the "MODE-0A" command is not transmitted from the ECU 1 to the external tool 23 (S420:NO), it can be determined that the diagnosis object of the diagnosis process in the ECU 1 is not in a normal condition, indicating that storage of the DTC to the EEPROM 11 is not permitted. Therefore, the installation of the ECU 1 to the vehicle is determined to be not in a normal condition (S440).

Thus, in that case, the external tool 23 is operated to transmit a command to request the DTC in the standby RAM 9, and, by viewing the data displayed on the display unit of the external tool 23 after being transmitted from the ECU 1 to the external tool 23 in response to the command (i.e., the DTC in the standby RAM 9), the contents of the abnormality can easily be analyzed such as a failure of connection occurring at a certain point or the like (S450).

In other words, because storage of the DTC to the standby RAM 9 is always permitted in the ECU 1 (S130), the DTC to show abnormality detected during installation of the ECU 1 to the vehicle remains in the standby RAM 9. Therefore, about a malfunction, a trouble and the like that occurred during the installation to the vehicle can be analyzed easily by retrieving the DTC in the standby RAM 9.

Furthermore, according to the ECU 1 of the present embodiment, when the response data in response to the "MODE-0A" command from the external tool 23 has been sent back to the external tool 23 (S420:YES), it indicates that the data of the top address of the DTC storage in the EEPROM 11 is rewritten from "0000" to "& 5AA5," thereby leading to a confirmation that reading to and writing from the EEPROM 11 are performed normally on a basis that the process has performed the confirmation in S320 of FIG. 4. In addition, at the same time with such a confirmation, the data of the DTC storage in the EEPROM 11 can be confirmed, particularly on the point that the data at the top address of the DTC storage is rewritten from "$0000" to "& 5AA5."

In addition, when a diagnosis for completion of the installation that all of the diagnosis objects are determined to be normal is provided after the installation of all of the diagnosis objects to the vehicle and before a shipment of the vehicle, rewriting of the data at the top address of the DTC storage in the EEPROM from "$0000" to "& 5AA5" indicates that storage of the PDTC to the EEPROM 11 is permitted, thereby leading to securely storing the DTC that must be diagnosed and stored for indicating abnormality at a stage that the vehicle is ready to be used in an actual condition after completion of inspection at the manufacturing plant.

In addition, the confirmation process by using the external tool 23 as described above can be carried out in the same manner when the ECU 1 is replaced with a new one in a repair shop of the vehicle. On the other hand, in the present embodiment, S110 in FIG. 2 as well as S120, S130 and S150 are equivalent to a diagnosis unit, and determination processing of S140 is equivalent to a storage permission unit, and processing of FIG. 3 is equivalent to a permission switching unit. Further, the DTC storage area (a storage area at the top address thereof in particular) in the EEPROM 11 is equivalent to a permission information storage unit. Furthermore, the external tool 23 is equivalent to an external device, and processing of FIG. 4 is equivalent to response unit.

Although the present invention has been fully described in connection with the preferred embodiment thereof with reference to the accompanying drawings, it is to be noted that various changes and modifications will become apparent to those skilled in the art.

For example, the permission information to indicate whether storage of the DTC to the EEPROM 11 is allowed may be stored in an area other than the DTC storage area in the EEPROM 11, or it may be stored in the standby RAM 9.

In addition, the rewritable nonvolatile memory may not only be, for example, the EEPROM, but also a flash memory.

Such changes and modifications are to be understood as being within the scope of the present invention as defined by the appended claims.

What is claimed is:

1. An electronic control unit installed in a vehicle, the electronic control unit comprising:
   a non-volatile memory capable of re-writing data;
   a standby RAM to which electric power is continuously supplied for storing data;
   a diagnosis unit capable of checking if a failure has occurred in a device installed in the vehicle based on information from the device and storing abnormality data in the non-volatile memory after determining that an abnormality has occurred in the device installed in the vehicle;
   a permission information storage capable of storing permission information indicating whether or not storage of the abnormality data in the non-volatile memory is permitted;
   a permission switching unit capable of switching the permission information from non-permission of the storage of the abnormality data to permission of the storage of the abnormality data after the diagnosis unit has determined that the device installed in the vehicle is in a normal condition with no indication of abnormality; and
   a storage permission unit capable of permitting the diagnosis unit to store the abnormality data in at least one of the non-volatile memory and the standby RAM,
   wherein when the diagnosis unit detects an abnormality in the device and the permission information storage permits the storage of the abnormality data in the non-volatile memory, the storage permission unit stores the abnormality data in the non-volatile memory and the standby RAM, and
   wherein when the diagnosis unit detects an abnormality in the device and the permission information storage does not permit the storage of the abnormality data in the non-volatile memory, the storage permission unit stores the abnormality data in the standby RAM.

2. The electronic control unit according to claim 1, wherein the permission information storage is a predetermined memory area in the non-volatile memory.

3. The electronic control unit according to claim 2, wherein the permission switching unit re-writes data in the predetermined memory area from an initial value that is set prior to installation of the electronic control unit in the vehicle to a specific value that is different from the abnormality data upon determining that the device installed in the vehicle is in the normal condition,
   data having the initial value in the predetermined memory area indicates non-permission of the storage of the abnormality data, and
   data not having the initial value in the predetermined memory area indicates permission of the storage of the abnormality data.

4. The electronic control unit according to claim 1 further comprising:
   a response unit configured to transmit a response signal to an external device in response to a request signal received from the external device on a condition that the permission information indicates permission of the storage of the abnormality data.

5. The electronic control unit of claim 4, wherein the request signal requests data in the memory area that is used to store the abnormality data in the non-volatile memory, and
   the response unit transmits data in the memory area that is used to store the abnormality data to the external device.

6. The electronic control unit of claim 1, wherein the device includes a plurality of sub-devices,
   wherein when a second sub-device is dependent upon a first sub-device, such that when the first sub-device is determined to be in a normal condition, the second sub-device can never be determined to be in an abnormal condition, the diagnosis unit omits the second sub-device from a diagnosis process when the first sub-device is determined to be in normal condition.

7. An electronic control unit installed in a vehicle, the electronic control unit comprising:
   a non-volatile memory capable of re-writing data;
   a standby RAM to which electric power is continuously supplied for storing data; and
   a diagnosis unit capable of storing abnormality data in at least one of the non-volatile memory and the standby RAM after determining that an abnormality has occurred based on information from a device installed in the vehicle, the diagnosis unit determining the abnormality prior to shipment of the vehicle,
   wherein when the diagnosis unit determines that the device installed in the vehicle is in a normal condition with no indication of abnormality, storage of a result of the diagnosis is permitted in the non-volatile memory, and
   wherein when the diagnosis unit determines that the device installed in the vehicle is in an abnormal condition, storage of the result of the diagnosis is permitted in the standby RAM.

8. The electronic control unit of claim 7, wherein the device includes a plurality of sub-devices,
   wherein when a second sub-device is dependent upon a first sub-device, such that when the first sub-device is determined to be in a normal condition, the second sub-device can never be determined to be in an abnormal condition, the diagnosis unit omits the second sub-device from a diagnosis process when the first sub-device is determined to be in normal condition.

9. An electronic control unit installed in a vehicle, the electronic control unit comprising:
   a non-volatile memory capable of re-writing data, wherein the non-volatile memory has an initial value stored in the non-volatile memory before the ECU is installed in the vehicle,
   a standby RAM to which electric power is continuously supplied for storing data; and a diagnosis unit capable of storing abnormality data in at least one of the non-volatile memory and the standby RAM after determining abnormality based on information from a device installed in the vehicle, wherein when the initial value is stored in the non-volatile memory, storage of a result of diagnosis by the diagnosis unit is permitted in the standby RAM and is not permitted in the non-volatile memory;

wherein when change of the initial value is detected in a period after installation of the electronic control unit in the vehicle and before shipment of the vehicle, storage of the result of diagnosis by the diagnosis unit is permitted in the non-volatile memory and in the standby RAM.

10. The electronic control unit of claim 9, wherein the device includes a plurality of sub-devices, wherein when a second sub-device is dependent upon a first sub-device, such that when the first sub-device is determined to be in a normal condition, the second sub-device can never be determined to be in an abnormal condition, the diagnosis unit omits the second sub-device from a diagnosis process when the first sub-device is determined to be in normal condition.

* * * * *